March 17, 1959

T. V. WILLIAMS 2,877,535

CHIP BREAKER FOR TURNING MACHINES

Filed June 10, 1955

Inventor
Thurston V. Williams
by Roberts, Cushman & Grover
Att'ys

United States Patent Office 2,877,535
Patented Mar. 17, 1959

2,877,535

CHIP BREAKER FOR TURNING MACHINES

Thurston V. Williams, Milford, N. H., assignor to The O. K. Tool Company, Inc., Milford, N. H., a corporation of New Hampshire Application June 10, 1955, Serial No. 514,501

4 Claims. (Cl. 29—96)

In the process of machining and cutting turning stock on a lathe, the cut away portion is commonly referred to as a chip. Depending upon the depth of the cut as determined by the set of the cutting tool and the tool holder for the conventional lathe, the size of the chip will vary both in cross-section and length. In turning stock which is particularly tough, these chips may form to such size that they are not only an inconvenience but an actual hazard to the operator and substantially impair the efficiency of the machining process. Especially with metallic turning stock, these chips assume a spiral configuration with sharp edges and points and continue to form into great length in the machining process.

Objects of the present invention are to provide, in conjunction with a tool holder and cutting tool, a chip breaker which may be adjusted without disturbing the set of the tool holder or the cutting tool, which may be adjusted to any desired position whereby the chips can be broken into predetermined pieces of small size, and which is simple in design, economical in manufacture, and capable of easy adjustment.

Accordingly, the present invention comprises a block of hard material, preferably steel, which is fitted upon the tool holder and cutting tool in spaced relation to the cutting edge of the cutting tool and to the turning stock. This hard material, which is called a chip breaker may be of any confiuration, square, rectangular, round, or elliptical. In preferred form the chip breaker has a plurality of chip-breaking surfaces, each of which forms an abutment which is substantially perpendicular to the longitudinal axis of the cut chips and against which the chips are forced, thereby breaking them into small sections. The chip breaker has an eccentric hole within its outer periphery as defined by the chip-breaking surfaces, and preferably the walls of said hole are internally splined to cooperate with a bolt having a head which is externally splined and of slightly smaller circumference. This said bolt when tightened into a threaded hole in the tool holder, after extending through the cutting tool, clamps the cutting tool on the tool holder. The splined bolt head is also provided with a transverse screw-driver slot and a threaded circular recess concentrically located about the longitudinal axis of the bolt. To accomplish the objects of the invention as specified and to adjust the chip-breaking surface to any desired distance from the cutting edge of the tool and the turning stock, it is merely necessary to align the splined surfaces for interengagement and to prevent disengagement by any convenient locking device. One practical means is to place a washer over the chip breaker, said washer being of greater diameter than the splined hole, and thread a small screw through said washer into the threaded hole in the splined head previously mentioned.

Figure 1:
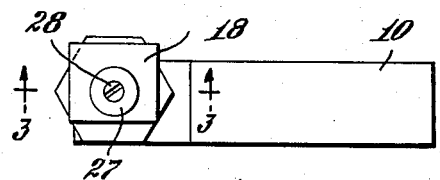
Fig. 1 is a plan view of the invention with tool holder and a multi-sided cutting tool.
Figure 2:
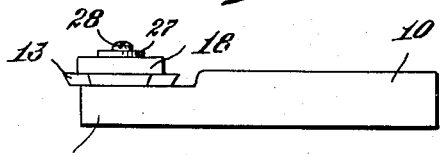
Fig. 2 is an elevational view.

In the embodiment shown in Figs. 1 to 5, 10 designates a conventional tool holder having a shank end 11 with radial serrations 12 on the top portion thereof. A muli-sided cutting tool 13 has radial serrations 14 on the underneath side of the same general contour as the serrations 12. The serrated surfaces 12 and 14 are interengaged and rigidly held in position by means of a machine screw 15 with an externally threaded hole 17 in the shank end 11 of tool holder 10.

The chip breaker 18 may be rectangular in configuration and in the preferred embodiment has four chip-breaking surfaces 19, 20, 21 and 22. Within the periphery of the chip breaker 18, as defined by the chip-breaking surfaces 19, 20, 21 and 22, is a hole 23 having internally splined sidewalls 24. The hole 23 is eccentrically located as shown in Fig. 1, thereby resulting in a different distance from the center of the hole 23 to any one of the four chip-breaking surfaces. The screw 15 previously mentioned is provided with an enlarged externally splined head 25 and a transverse screw-driver slot. Extending into the head end of the screw 15 along the axis thereof is a screw opening 26.

Figure 3:
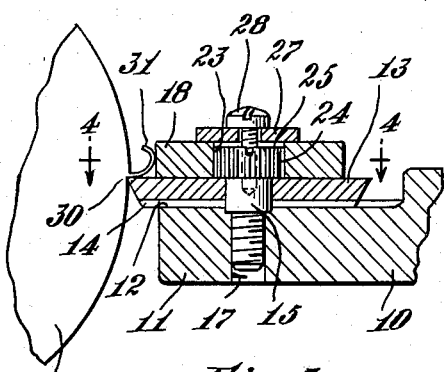
Fig. 3 is a sectional view taken on line 3—3 of Fig. 1.
Figure 4:
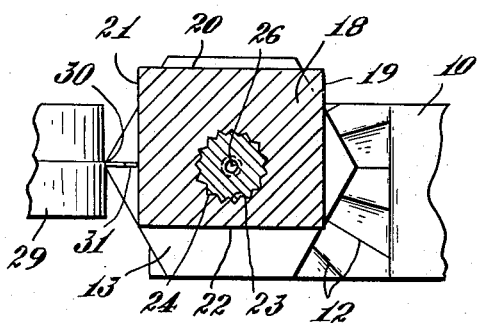
Fig. 4 is a sectional view taken on line 4—4 of Fig. 3.
Figure 5:
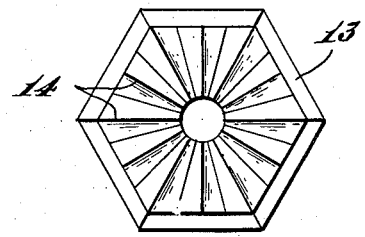
Fig. 5 is a bottom view of the cutting tool shown in Figs. 1 to 4.

Fig. 3 shows in cross-section the chip breaker 18 when assembled for use in connection with the tool holder 10 and the cutting tool 13. The internally splined sidewalls 24 slidably engage the splined bolt head 25 whereby the chip breaker 18 rests upon the cutting tool 13. A washer 27 of greater diameter than hole 23 is positioned on the chip breaker 18 over the bolt 15. A small screw 28 is then inserted through the washer 27 and tightened into the threaded recess 26. The interengagement of the splined surfaces 24 and 25 prevents turning of the chip breaker 18, and the screw 28 and the washer 27 hold the chip breaker against the tool.

In operation, as the turning stock 29 rotates the cutting point 30 pares away a portion thereof which forms a chip 31. As the stock 29 continues to rotate, the chip 31 is forced against the chip-breaking surface 21 which forms a vertical abutment. As the process continues the chips are broken into small fragments because of the continuous force exerted along the longitudinal axis of the chip 31 and the abutting relationship with chip-breaking surface 21. To adjust the distance from the cutting point 30 to the vertical abutment of the chip breaker 18 and thereby control the size of the chips 31 for various types of turning stock, it is necessary only to loosen screw 28 and remove said screw and washer 27. Then the chip breaker 18 may be lifted off the splined head 25 and turned to the desired position and replaced. Because the hole 23 is eccentrically located as previously described, the distance from the cutting point 30 to the chip-breaking surface is varied as the chip breaker 18 is turned alternately positioning one of the four sides 19, 20, 21 or 22 nearest the turning stock 29. After the adjustment is made, the washer 27 is replaced on the chip breaker 18, and the screw 28 is inserted through the washer 27 into threaded recess 26. Thus it may be seen that the chip breaker 18 may be adjusted to any desired position or may be removed completely without disturbing the position and fine adjustment of the tool holder 10 and the cutting tool 13.

Figure 7:
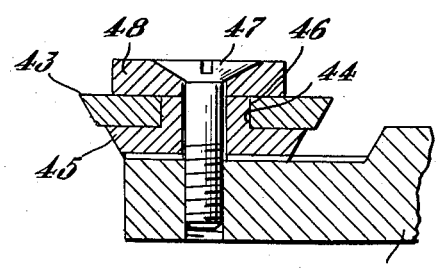
Fig. 7 is a section on line 7—7 of Fig. 6.
Figure 6:
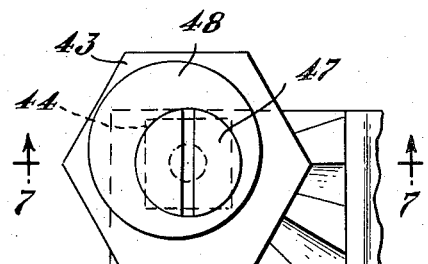
Fig. 6 is a plan view of a modification.

The modification shown in Figs. 6 and 7 comprises a tool holder 40 like 10, a tool 43 like 13 except that it has a square opening 44 instead of a round opening and no serrations on the bottom, and a chip breaker 48 similar to 18. However instead of seating on the tool holder the tool 43 seats on an intermediate part 45 which is serrated on the bottom to fit the serrated tool holder and on top has a square projection 46 fitting into the square opening 44. The parts are held together by a screw 47 threaded into the tool holder. The screw opening through the chip breaker is eccentric as before but instead of being rectangular the chip breaker is round so that its distance from the cutting edge may be adjusted gradually instead of step by step.

It should be understood that the present disclosure is for the purpose of illustration only and that this invention includes all modifications and equivalents which fall within the scope of the appended claims.

I claim:

1. In apparatus of the character referred to, the combination of a tool holder, a cutter tool, a chip breaker, the parts having aligned openings, and a fastener extending through the openings for holding the parts together with the periphery of the chip breaker offset a predetermined distance behind the cutting edge of the tool, the opening through the chip breaker being off-center so that rotation of the chip breaker about the axis of said aligned openings varies said distance.

2. In apparatus of the character referred to, the combination of a tool holder, a cutting tool mounted on the holder, a chip breaker mounted on the tool with its chip breaking periphery offset a predetermined distance behind the cutting edge of the tool, the parts having aligned openings, and a fastener extending through the openings for holding the parts together, the opening through the chip breaker being off-center so that rotation of the chip breaker about the axis of said aligned openings varies said distance.

3. In combination with a tool holder and cutting tool mounted thereon for shaping metallic stock, a chip breaker having a circular configuration and having a hole therethrough, said hole being eccentrically located within the periphery of said chip breaker, a splined surface defining the walls of said hole, a bolt having a splined head, a transverse slot therein, a circular recess in said splined head internally threaded, said bolt extending through said cutting tool and seating into said tool holder, interengagement between said splined surface and said splined head, a washer of greater diameter than said hole, a screw extending therethrough, said screw snugging into said circular recess whereby said chip breaker is maintained in a fixed predetermined position and is capable of adjustment.

4. In combination with a tool holder and cutting tool mounted thereon for shaping metallic stock, a chip breaker having an opening extending therethrough from one side to the opposite side, a fastener extending through said opening and holding the aforesaid parts in assembled, operative relation with the periphery of the chip breaker offset a predetermined distance behind the cutting edge of the tool, the entire periphery of the chip breaker being shaped for chip breaking and said opening being off-center so that any part of said entire periphery may be turned into chip-breaking position, thereby to vary said distance through a wide range.

References Cited in the file of this patent

UNITED STATES PATENTS

| | | |
|---|---|---|
| 1,854,672 | Robinson | Apr. 19, 1932 |
| 2,173,772 | Trimmons | Sept. 19, 1939 |
| 2,181,023 | Moore | Nov. 21, 1939 |
| 2,451,574 | Paraschuk | Oct. 19, 1948 |
| 2,457,469 | Hillman | Dec. 28, 1948 |

FOREIGN PATENTS

| | | |
|---|---|---|
| 403,286 | France | Sept. 21, 1909 |
| 604,235 | Germany | Oct. 17, 1934 |
| 1,025,299 | France | Apr. 13, 1953 |